US011281462B1

(12) United States Patent
Manzano et al.

(10) Patent No.: US 11,281,462 B1
(45) Date of Patent: Mar. 22, 2022

(54) RULE-BASED SCORING FOR APIS

(71) Applicant: salesforce.com, inc., San Francisco, CA (US)

(72) Inventors: Ignacio Agustin Manzano, Buenos Aires (AR); Guillermo Coscarelli, Buenos Aires (AR); Antonio Garrote, London (GB); Fernando Alberto Zavalia Paunero, Buenos Aires (AR); Agustin Lopez Gabeiras, Buenos Aires (AR); Pedro Colunga, Buenos Aires (AR)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 17/097,138

(22) Filed: Nov. 13, 2020

(51) Int. Cl.
*G06F 8/77* (2018.01)
*G06F 8/10* (2018.01)
*G06F 9/54* (2006.01)

(52) U.S. Cl.
CPC .................. *G06F 8/77* (2013.01); *G06F 8/10* (2013.01); *G06F 9/547* (2013.01)

(58) Field of Classification Search
None
See application file for complete search history.

(56) References Cited

U.S. PATENT DOCUMENTS

| 2015/0363374 | A1* | 12/2015 | Lees | G06F 8/73 |
| | | | | 715/256 |
| 2018/0255089 | A1* | 9/2018 | Wilton | H04L 63/0884 |
| 2018/0314622 | A1* | 11/2018 | Lowe | G06F 9/44526 |
| 2021/0303454 | A1* | 9/2021 | Wang | G06F 11/3692 |

* cited by examiner

*Primary Examiner* — Qing Chen
(74) *Attorney, Agent, or Firm* — Sterne, Kessler, Goldstein & Fox P.L.L.C.

(57) ABSTRACT

Disclosed herein are system, method, and computer program product embodiments for facilitating access to and incorporation of APIs within an application during development, while ensuring that the API satisfies quality constraints. These quality constraints are controlled by the application of rules, which result in a maturity score for the API, in accordance with embodiments. These rules may be provided by a variety of sources for use in scoring the API at various stages. For example, a developer group may control access to developers within the group by applying a ruleset that restricts APIs for applications written by the developer group to a threshold score. This threshold score can limit or restrict APIs that are offered to a developer by an API exchange. Additionally, a ruleset may be applied to enforce a minimum score for submission of an API for inclusion within an API exchange.

15 Claims, 4 Drawing Sheets

RULE-BASED SCORING FOR APIS

BACKGROUND

Representational state transfer (REST) web services (or, RESTful web services) are services satisfying several core principles of REST, such as the use of stateless operations, client-server relationships, and unique identification of resources through a uniform resource identifier (URI). Commonly, requests to these RESTful web services are made through Hypertext Transfer Protocol (HTTP) requests, that include instructions such as GET (to read a resource at a URI), PUT (to update a resource at the URI), DELETE (to remove a resource at the URI), and POST (to create a new resource).

These services may be developed and implemented in conformance with the use of an Application Program Interface (API). The API defines how requests are made and answered by the service. Developers can generate APIs through the use of API specifications, which in the context of RESTful web services are often defined in languages such as RESTful API Modeling Language (RAIVIL) or OpenAPI Specification (OAS).

A developer intending to interface with a particular API will typically need to rely on whatever public-facing information is available regarding that API in order to make choices regarding implementation of their own application. This results in uneven practices.

Accordingly, what is needed are tools for improving and normalizing use of APIs.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing rule-based scoring for APIs on an exchange.

In order to build an application that relies on APIs to obtain or supply information, an application developer must review the API, or its documentation if available, to determine how to call the relevant resources. For example, if a developer needs to configure their application to obtain information about accounts on a system, the developer may look for an existing API that provides an interface to the accounts.

While this approach may allow a developer to ultimately connect to the appropriate API and access the needed information, the onus is on the developer to ensure that the right level of care is taken in selecting the API and interfacing it. And while the developer may be instructed to follow certain best practices in selecting an API to interface with, those best practices are only enforced insofar as the developer properly follows them.

Figure 1:
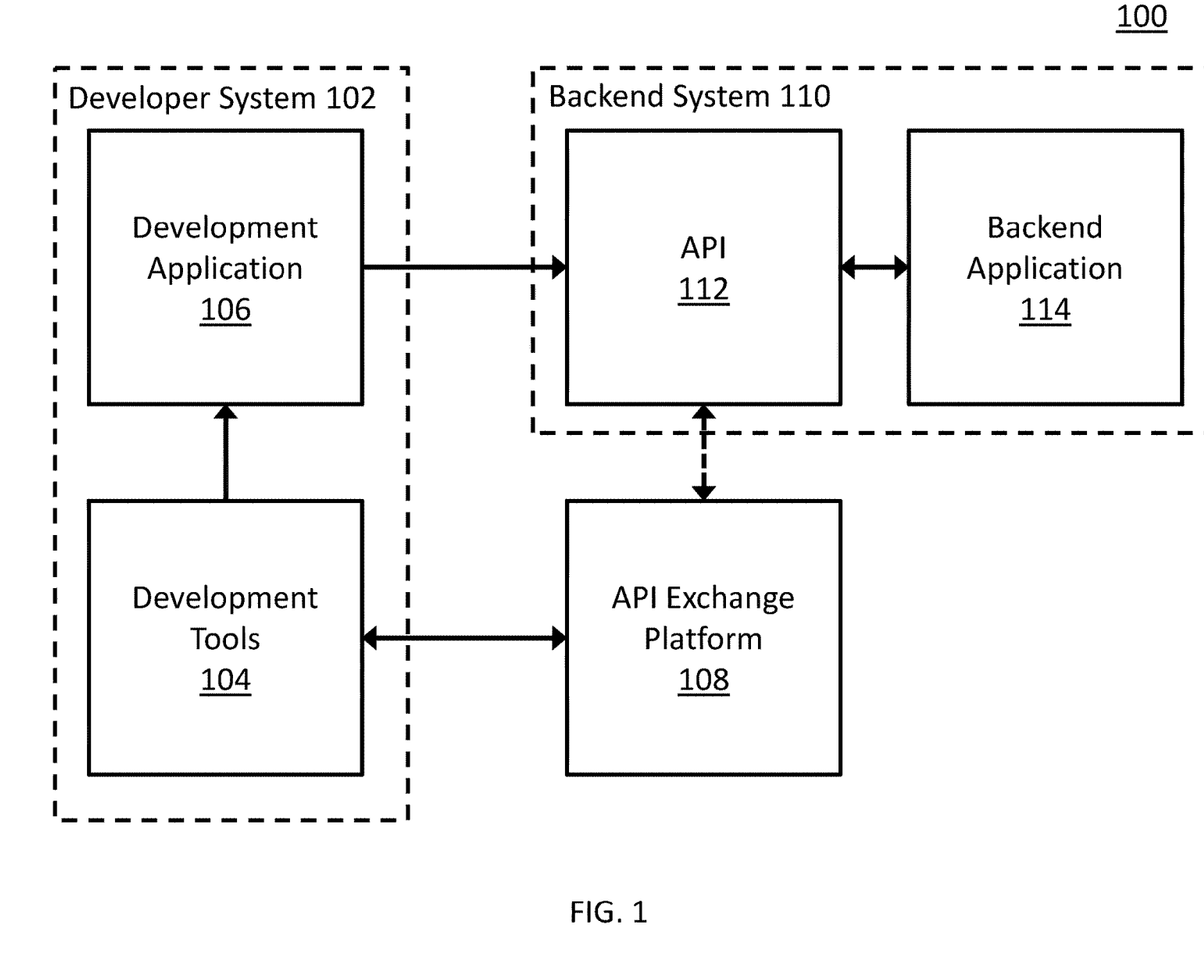
FIG. 1 illustrates an API exchange platform, in accordance with an embodiment.

FIG. 1 illustrates an API exchange platform 100, in accordance with an embodiment.

As shown in FIG. 1, a developer system 102 includes development tools 104 and a development application 106. An application developer can use development tools 104 to aid in the development of development application 106. Ultimately, the development application 106 is developed such that it interfaces with a backend system 110, accessing a backend application 114 via an API 112.

In order to simplify the identification of APIs, such as API 112, that a developer can use to interface a development application 106 to a backend application, such as backend application 114, it is possible to employ an API exchange platform 108 to serve as a sort of central repository, in accordance with an embodiment. API exchange platform 108 allows API developers, such as a developer of API 112, to publish their APIs for access by application developers.

Access to API exchange platform 108 from developer system 102 can be, by way of non-limiting example, through development tools 104. In other embodiments, an application developer can access API exchange platform 108 through other mechanisms, such as a separate web browser or dedicated application. If the access to API exchange platform 108 is through development tools 104, then the application developer may be able to integrate references to a selected API, such as API 112, directly into their development application 106 when the API 112 is selected from the API exchange platform 108 for use. One skilled in the relevant arts will appreciate that tight integration between development tools 104 and API exchange platform 108 can provide other synergies in developing development application 106.

In accordance with an embodiment, an application developer can search through API exchange platform 108 to identify relevant APIs for their use. For example, the application developer may search for an API that provides access to certain pieces of information that are needed for development application 106. When the application developer identifies an API 112 that provides access to the information they need, they may review any information about the API 112 to determine suitability of the API 112. For example, an application developer may consider whether the API 112 is sufficiently well-documented that usage of API 112 would be consistent with reliability and accuracy requirements of their development application 106.

In order to streamline access to APIs on the basis of application developer requirements, an API scoring platform is provided that, based on certain rules, specifies how well a given API 112 satisfies those rules. This allows for APIs to be scored according to best practices for a particular developer or developer group, in accordance with an embodiment. Even within a single organization, APIs may be developed to different standard for different groups within the organization, and it may be difficult to homogenize best practices for API development. Therefore, by scoring APIs in API exchange platform 108 according to the criteria of a particular developer or developer group, it is possible to apply best practices to application development that uses APIs, while allowing application developers quick and seamless access to the APIs they are permitted to use.

In accordance with an embodiment, APIs in API exchange platform 108 are scored according to rules. By applying these rules, it is possible to normalize and compare how APIs meet best practices defined by the rules, and how mature an API is. These rules can be provided by the API exchange platform 108 itself (e.g., according to organization-wide standards), or may be controlled at the developer or development group level, where they can be applied at development tools 104. Or, moreover, the rules may be applicable at the developer or development group level, but held at API exchange platform 108 for application there.

When the rules are applied to an API, the result is a score for that API according to the rules, in accordance with an embodiment. This score can be applied to a variety of possible use cases to aid a developer in selecting an API, such as API 112, from API exchange platform 108.

In an embodiment, if an application developer searches the API exchange platform 108 (e.g., through an integration with development tools 104) for an API capable of providing certain required information, multiple APIs may be provided in the search results. For example, if an application developer specifies the need for customer addresses from a customer database in backend application 114, there may be multiple APIs (including API 112) that provide this functionality. When presented with similar APIs in the search results that provide access to the required information (the customer addresses in this case), the application developer may compare scores for the similar APIs and, if desired, select the API with the higher score based on that score.

In an additional embodiment, the API exchange platform 108 may sort its search results according to the scores, in accordance with an embodiment. This behavior may be requested by the application developer as part of the search (e.g., sort results by score), or once the results are presented to order the results according to scores, by way of non-limiting example.

In a further embodiment, the API exchange platform may recommend similar APIs that have not been scored, based on a comparison with scored APIs.

By allowing an application developer to look through API results that match their criteria for requested information and quickly visualize score, an application developer can quickly select a satisfactory API 112 to interface with backend application 114 without the need to go through each matching API one-by-one, read through their information (e.g., the API definition), and determine that way which API to use—an onerous process when there are multiple available options.

In addition to simplifying developer considerations for weighting the criteria considered by the rules, the score may be used to limit or otherwise restrict incorporation of APIs into a development application 106 altogether. For example, a developer group may have a set of rules applied to all developers in the group. When any developer in the developer group searches API exchange platform 108 for an API, any results that score below a threshold score may be left out of the search results (e.g., omitted entirely, or otherwise designated as unavailable). Using this approach, a developer group can ensure that all API usage meets group-level requirements based on the threshold score.

In addition to applying the rules on the application developer side to ensure that a selected API 112 complies with the developer's or developer group's needs, the rules can be used for development of the API 112 itself. An API developer (e.g., a developer responsible for coding API 112 to provide access by, e.g., an application developer, to backend application 114) may be interested in ensuring that API 112 meets certain criteria to ensure broad access. In an embodiment, the rules for scoring an API may be applied to API 112 as it is coded (e.g., in real-time, or upon request) to the API developer. This allows the API developer to modify API 112 to ensure compliance (e.g., a minimum score) with that particular rule set. In addition, API exchange platform 108 may provide additional controls to require an API developer to meet certain minimum score requirements (for a given rule set) before the API 112 can be published to API exchange platform 108 and available to application developers—regardless of the application developer's own (possibly separate) rule-based scores for the API 112.

Figure 2:
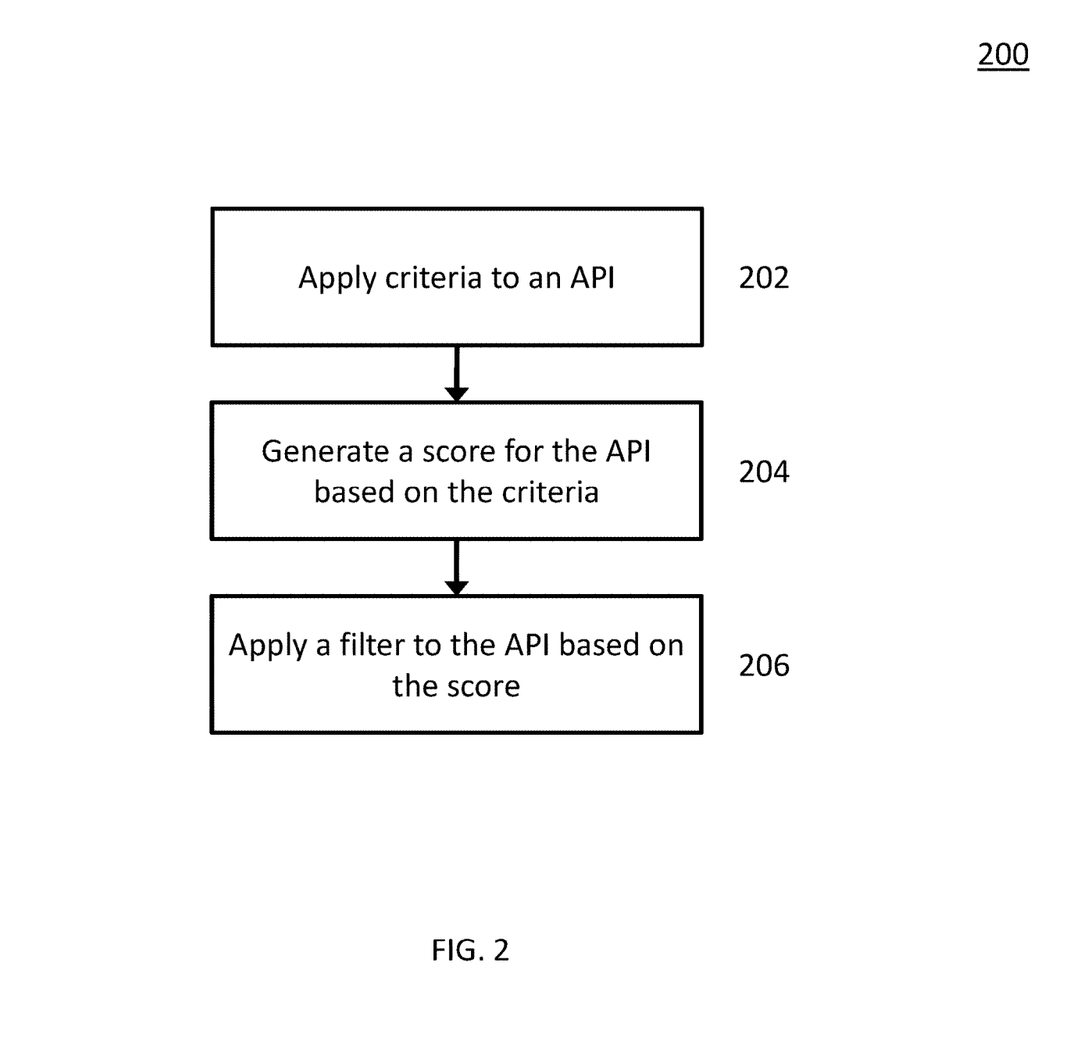
FIG. 2 is a flowchart illustrating steps by which APIs in an API exchange platform can be restricted based on score, in accordance with an embodiment.

FIG. 2 is a flowchart 200 illustrating steps by which APIs in an API exchange platform (such as API exchange platform 108) can be restricted based on score, in accordance with an embodiment. At step 202, a set of criteria are applied to an API to determine a degree of maturity for the API. For example, by applying rules that capture the desired criteria, it is possible to determine an API's maturity in the way of modularity, completeness, and other quantifiable aspects.

At step 204, a score is generated based on the criteria, in accordance with an embodiment. This score, which is computed through rules that reflect the criteria in an embodiment, is specific to the particular set of rules and therefore may vary between developers or developer groups based on their own criteria. And, at step 206, APIs may be filtered (e.g., included or excluded in a search result) on the basis of the score.

In addition to applying the scoring rules in a way that simplifies application development by identifying compliant APIs, application development using APIs can be further simplified by providing an accessible approach to defining the very rules used to score APIs by this approach.

In accordance with an embodiment, APIs being compared and scored are represented according to a unified model. An API definition (e.g., a RAML or OAS document) can be reviewed using rules. The rules can score the API definition based on security issues, documentation, the presence or absence of usage examples, camel case usage, HTTP return codes, and other properties of the API. Weights can be applied to rules relating to these properties, and weights can also be applied to individual sections of the API definition.

For a given API specification, a number of different rules can be created to score the specification on the basis of characteristics of the API specification and the operation of the API itself. By way of non-limiting example, the following rules can be applied (and weighted appropriately as needed) in the process of determining a final score for an API specification:

Avoiding Create, Read, Update, Delete (CRUD) actions in query parameters
Description of the API MUST NOT BE empty
Content-Type MUST BE used (e.g., PUT/POST)
Documentation MUST BE provided
Element name MUST BE camel case
Underscores (_) MUST NOT BE used in URIs
GET MUST BE used to retrieve a representation of a resource
PUT MUST BE used to update mutable resources
PUT MUST return HTTP Code OK (200)
POST MUST return HTTP Code Created(201)

Figure 3:
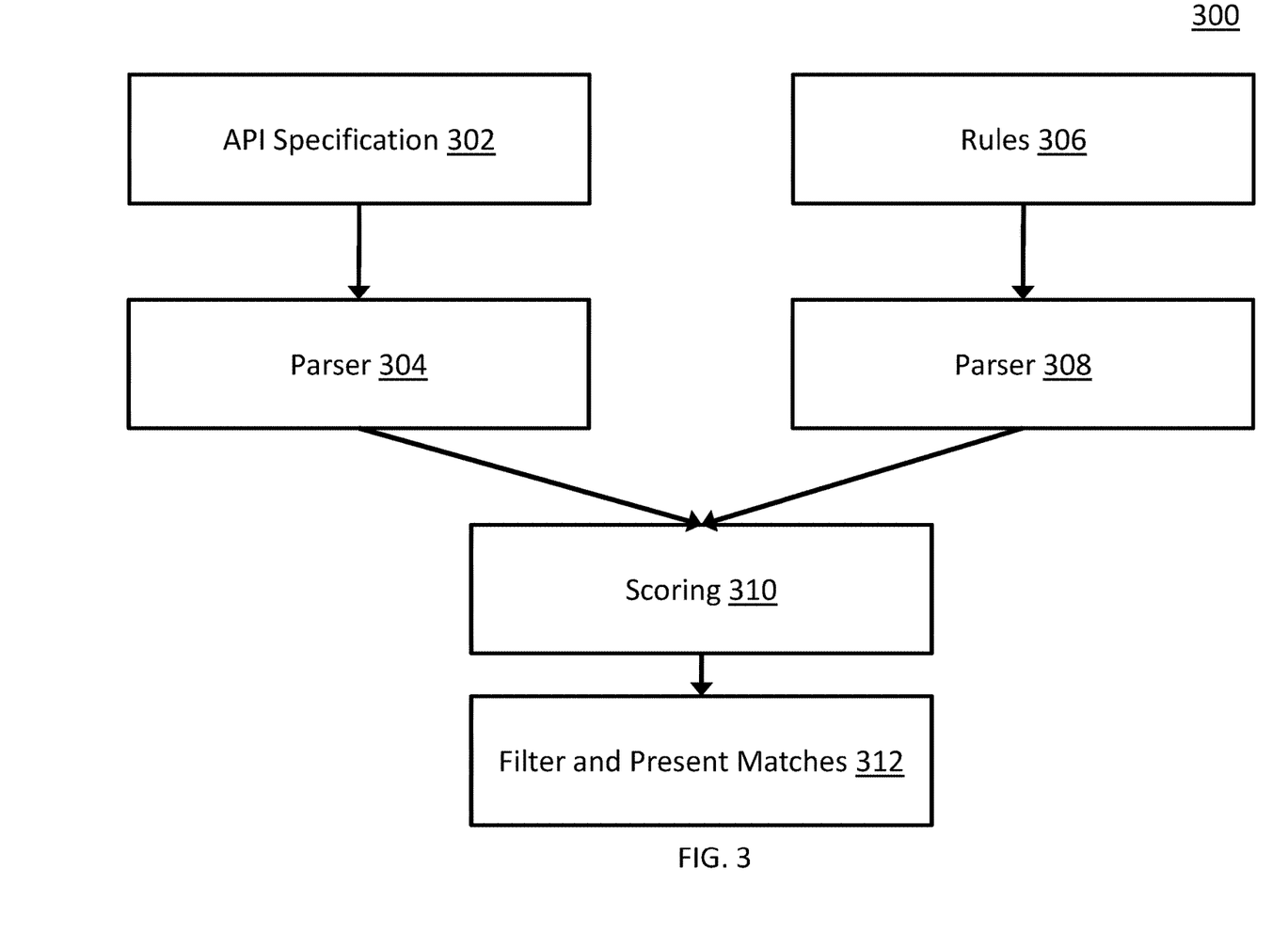
FIG. 3 illustrates a scoring platform, in accordance with an embodiment.

FIG. 3 illustrates a scoring platform 300, in accordance with an embodiment. In scoring platform 302, an API specification 302 to be scored is run through parser 304 in order to identify elements of the API specification 302 that can be used in scoring. By way of non-limiting example, the elements identified in API specification 302 include 'types' (e.g., Content-Type, element names, descriptions, etc.) and 'endpoints' (e.g., '/accounts' in a 'GET/accounts' request)

Scoring platform 300 also accepts rules 306, which are parsed by parser 308 to determine which elements of API specification 302 will be considered (e.g., a list of types and/or endpoints) and various weights applied to each rule for determining a final score. The resulting parsed rules from parser 308 are applied to the elements of API specification 302 from parser 304, and used to produce a score by scoring module 310. This score can then be used, as previously described, to filter and present matches in 312 (e.g., to provide APIs by API exchange platform 108 of FIG. 1 that meet a minimum score).

In accordance with an embodiment, the score can be calculated by the following exemplary approach:

$$\text{WebAPI Score} = \{x | x \geq 0\}$$

$$\text{rule}(e) = \{x | x = 0 \text{ or } x = 1\}$$

$$\alpha = \text{rule weight} = \{x \in \mathfrak{R} \mid 0 \leq \alpha \leq 1\}$$

$$\beta_s = \text{section weight} = \{x \varepsilon \mathfrak{R} \mid 0 \leq \beta \leq 1\} \text{ where } \sum_{s=1}^{n} \beta_s = 1$$

$$\text{WebAPI Score} = \sum_{s=1}^{n} \text{median}\left(\sum_{w=1}^{m} \text{rule}_s(e) * \alpha\right) * \beta_s$$

In simple terms, and by way of facilitating understanding, this exemplary approach can take various sections of an API specification (e.g., types and endpoints), find weighted averages of rule results for each section, and then find a weighted average of the sections together in order to compute a final overall score for the API specification.

For example, given the following elements of an API specification:
Types=$\{t_a, t_b, t_c\}$
Endpoints=$\{E_1, E_2, E_3, E_4, E_5\}$ Then the above algorithm would weight rules applied to each section (types, endpoints) separately to find a median for each, and then will weight them together to find a final score, in accordance with an embodiment. One skilled in the relevant arts will recognize that, in certain embodiments, a given element within a section, or a given section, may be given full or no weight (e.g., 1 or 0, on a scale of [0 . . . 1]).

Typically, a rule would be written to apply to either types or endpoints, but not both, given the differences in their construction. However, a rule could be applied to both (or, hypothetically, to other sections of an API specification) in determining a final rule score.

In a given example, five rules are applied to the exemplary API specification, rules $r_a, r_b, r_c, r_d,$ and $r_e$. Each rule can also be given a respective weight. For example:

|  | α weight | Applies to |
|---|---|---|
| $r_a$ | 0.2 | Types |
| $r_b$ | 0.5 | Types |
| $r_c$ | 0.7 | Endpoint |
| $r_d$ | 0.3 | Endpoint |
| $r_e$ | 0.1 | Endpoint |

Each rule is then either met or unmet by the element of the API specification to which it is applied, and is therefore given either the weight as a score, or a '0' if the rule is unmet. For example, rules $r_a$ and $r_b$ are applied only to the types (i.e., $\{t_a, t_b, t_c\}$), and therefore not applied in weighting the endpoints. This can be shown in tabular form as follows:

| $\text{rule}_s(e) * a$ | $t_a$ | $t_b$ | $t_c$ | $E_1$ | $E_2$ | $E_3$ | $E_4$ | $E_5$ |
|---|---|---|---|---|---|---|---|---|
| $r_a$ | 0.2 | 0 | 0.2 | x | x | x | x | x |
| $r_b$ | 0.5 | 0.5 | 0.5 | x | x | x | x | x |

In the above example, 'x' indicates that the element type does not apply to the rule (e.g., any of the endpoints), and is therefore '0'. By way of understanding, all three of the example types satisfied rule $r_b$ and therefore received the 0.5 weight contribution, but type $t_b$ did not satisfy rule $r_a$, for which it received a '0' weight.

Similarly, rules $r_c$, $r_d$, and $r_e$ are applied only to the endpoints, such that the rest of the tabulated values read as follows:

| $\text{rule}_s(e) * a$ | $t_a$ | $t_b$ | $t_c$ | $E_1$ | $E_2$ | $E_3$ | $E_4$ | $E_5$ |
|---|---|---|---|---|---|---|---|---|
| $r_a$ | x | x | x | 0.7 | 0 | 0.7 | 0 | 0.7 |
| $r_b$ | x | x | x | 0.3 | 0.3 | 0.3 | 0 | 0 |
| $r_c$ | x | x | x | 0 | 0.1 | 0.1 | 0 | 0.4 |

As in the previous example, the 'x' indicates that the element section does not apply to the rule (e.g., any of the types, in this case), and is therefore '0'. Again, if an element satisfies the rule, it is given the designated weight, or a '0' if not.

By way of non-limiting example, a rule such as "POST MUST return HTTP Code Created(201)" would be applied to an endpoint specified with a particular endpoint target, such as "POST/account". For the purposes of this example, the following endpoints could be designated in an API specification and weighted as above per the rules:
$E_1 \rightarrow$ GET/accounts
$E_2 \rightarrow$ GET/account/$\{id\}$
$E_3 \rightarrow$ POST/account
$E_4 \rightarrow$ DELETE/account/$\{id\}$
$E_5 \rightarrow$ GET/history Using the above-tabulated subscores, a total score can be calculated for each element:

| $\text{rule}_s(e) * a$ | $t_a$ | $t_b$ | $t_c$ | $E_1$ | $E_2$ | $E_3$ | $E_4$ | $E_5$ |
|---|---|---|---|---|---|---|---|---|
| $r_{total}$ | 0.7 | 0.5 | 0.7 | 1.0 | 0.4 | 1.1 | 0 | 0.8 |

And using the total scores for each element, a median can be calculated for each section:

Types = $\{0.7, 0.5, 0.7\}$  Median(types) = 0.7
Endpoints = $\{1.0, 0.4, 1.1, 0, 0.8\}$  Median(endpoints) = 0.8

In accordance with an embodiment, each section can be weighted separately then added together to achieve a final score. For example:
$\beta_{types} = 0.4$
$\beta_{endpoints} = 0.6$ Using these section weights, the result is a weight of (0.4*0.7)=0.28 for the types, and a weight of (0.6*0.8)=0.48 for the endpoints. This gives a final score of 0.28+0.48=0.76 (i.e., 76% score). This score can be used in the approaches described above to restrict, filter, select, or otherwise denote the acceptability of a given API using the applied rules, by way of non-limiting example.

Figure 4:
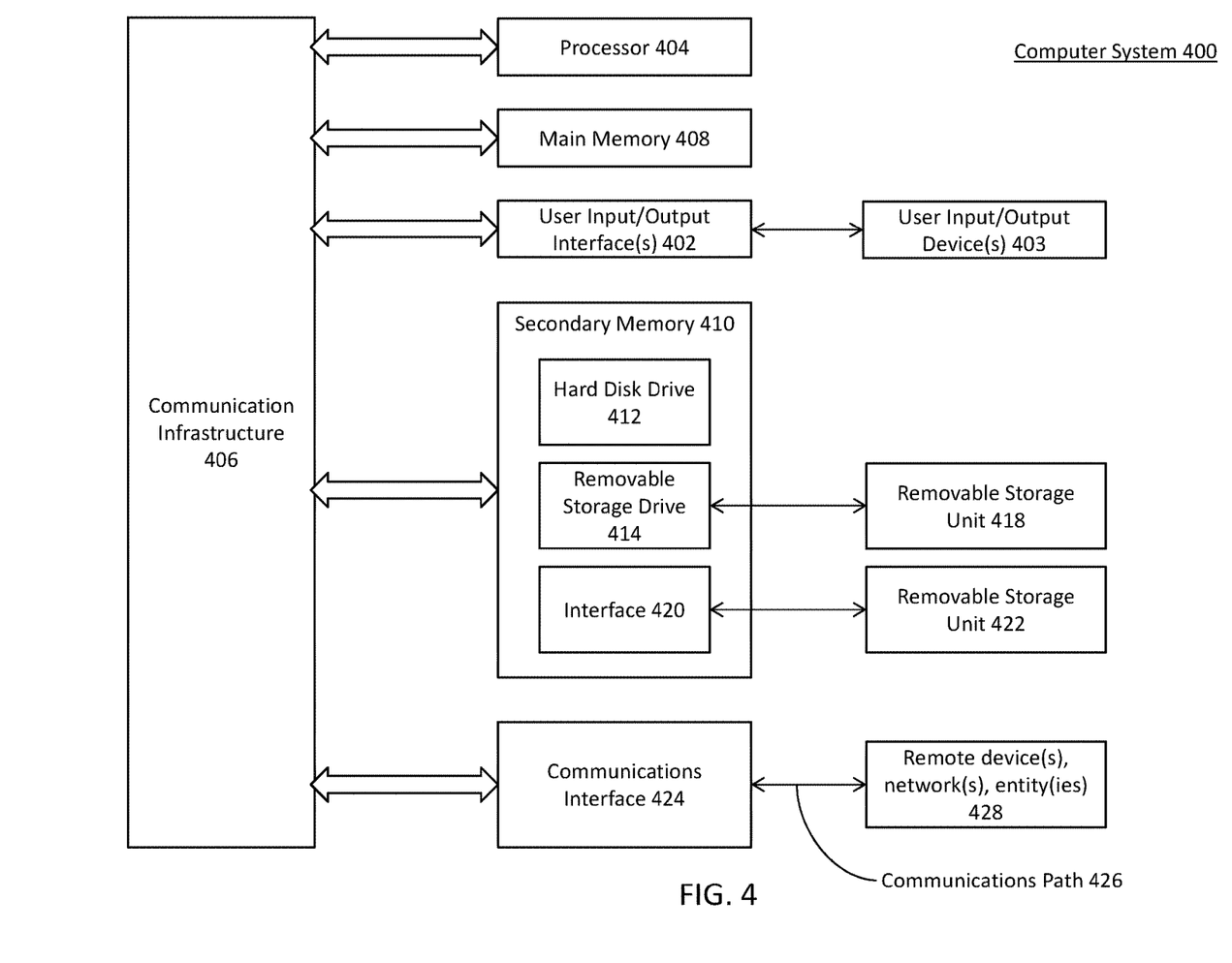
FIG. 4 is an example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include customer input/output device(s) 403, such as monitors, keyboards, pointing devices, etc., which may communicate with communication infrastructure 406 through customer input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418.

Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:
executing, by one or more computing devices, a ruleset against an application programming interface (API) specification corresponding to a backend application to determine a maturity score for the API specification, wherein a first rule of the ruleset is applied to a types section of the API specification to compute a median score for the types section of the API specification, wherein a second rule of the ruleset is applied to an endpoint section of the API specification to compute a median score for the endpoint section of the API specification, and wherein the maturity score for the API specification is computed by a weighted average of the median score for the types section of the API specification and the median score for the endpoint section of the API specification; and
publishing, by the one or more computing devices, the maturity score for the API specification.

2. The method of claim 1, wherein the maturity score for the API specification is based on a plurality of weights, and wherein a respective weight of the plurality of weights corresponds to an individual section of the API specification.

3. The method of claim 1, further comprising:
receiving, by the one or more computing devices, the ruleset from a developer account; and
selecting, by the one or more computing devices, the ruleset for the executing based on a request by the developer account for the API specification.

4. The method of claim 1, further comprising:
receiving, by the one or more computing devices, a search request for an API; and
providing, by the one or more computing devices, a response to the search request for the API that includes the API specification based on the maturity score for the API specification satisfying a threshold.

5. The method of claim 1, further comprising:
receiving, by the one or more computing devices, the API specification for distribution; and
accepting, by the one or more computing devices, the API specification for distribution based on the maturity score for the API specification satisfying a threshold.

6. A system, comprising:
a memory configured to store operations; and
one or more processors configured to perform the operations, the operations comprising:
executing a ruleset against an application programming interface (API) specification corresponding to a backend application to determine a maturity score for the API specification, wherein a first rule of the ruleset is applied to a types section of the API specification to compute a median score for the types section of the API specification, wherein a second rule of the ruleset is applied to an endpoint section of the API specification to compute a median score for the endpoint section of the API specification, and wherein the maturity score for the API specification is computed by a weighted average of the median score for the types section of the API specification and the median score for the endpoint section of the API specification; and
publishing the maturity score for the API specification.

7. The system of claim 6, wherein the maturity score for the API specification is based on a plurality of weights, and wherein a respective weight of the plurality of weights corresponds to an individual section of the API specification.

8. The system of claim 6, the operations further comprising:
receiving the ruleset from a developer account; and
selecting the ruleset for the executing based on a request by the developer account for the API specification.

9. The system of claim 6, the operations further comprising:
receiving a search request for an API; and
providing a response to the search request for the API that includes the API specification based on the maturity score for the API specification satisfying a threshold.

10. The system of claim 6, the operations further comprising:
receiving the API specification for distribution; and
accepting the API specification for distribution based on the maturity score for the API specification satisfying a threshold.

11. A non-transitory computer readable storage device having instructions stored thereon, execution of which, by one or more processing devices, causes the one or more processing devices to perform operations comprising:
executing a ruleset against an application programming interface (API) specification corresponding to a backend application to determine a maturity score for the API specification, wherein a first rule of the ruleset is applied to a types section of the API specification to compute a median score for the types section of the API specification, wherein a second rule of the ruleset is applied to an endpoint section of the API specification to compute a median score for the endpoint section of the API specification, and wherein the maturity score for the API specification is computed by a weighted average of the median score for the types section of the API specification and the median score for the endpoint section of the API specification; and publishing the maturity score for the API specification.

12. The non-transitory computer readable storage device of claim 11, wherein the maturity score for the API specification is based on a plurality of weights, and wherein a respective weight of the plurality of weights corresponds to an individual section of the API specification.

13. The non-transitory computer readable storage device of claim 11, the operations further comprising:
receiving the ruleset from a developer account; and
selecting the ruleset for the executing based on a request by the developer account for the API specification.

14. The non-transitory computer readable storage device of claim 11, the operations further comprising:
receiving a search request for an API; and
providing a response to the search request for the API that includes the API specification based on the maturity score for the API specification satisfying a threshold.

15. The non-transitory computer readable storage device of claim 11, the operations further comprising:
receiving the API specification for distribution; and
accepting the API specification for distribution based on the maturity score for the API specification satisfying a threshold.

* * * * *